R. A. A. S. PIERCY.
STAGING OR SUPPORT FOR SUBMARINE OPERATIONS.
APPLICATION FILED APR. 10, 1912.

1,127,507.

Patented Feb. 9, 1915.
15 SHEETS—SHEET 2.

Witnesses
Jas. K. McLathran
John H. Siggers

Robert A. A. S. Piercy, Inventor
By C. G. Siggers
atty.

R. A. A. S. PIERCY.
STAGING OR SUPPORT FOR SUBMARINE OPERATIONS.
APPLICATION FILED APR. 10, 1912.

1,127,507.

Patented Feb. 9, 1915.

Witnesses
Jas. K. McCathran
John B. Biggers

Inventor
Robert A. A. S. Piercy,
By C. G. Biggers
atty.

THE NORRIS PETERS CO., PHOTO-LITHO., WASHINGTON, D. C.

R. A. A. S. PIERCY.
STAGING OR SUPPORT FOR SUBMARINE OPERATIONS.
APPLICATION FILED APR. 10, 1912.

1,127,507.

Patented Feb. 9, 1915.
15 SHEETS—SHEET 6.

Witnesses
Jas. F. McCathran
John B. Siggers

Inventor
Robert A. A. S. Piercy,
By E. G. Siggers
atty.

THE NORRIS PETERS CO., PHOTO-LITHO., WASHINGTON, D. C.

R. A. A. S. PIERCY.
STAGING OR SUPPORT FOR SUBMARINE OPERATIONS.
APPLICATION FILED APR. 10, 1912.

1,127,507.

Patented Feb. 9, 1915.
15 SHEETS—SHEET 9.

Witnesses
Jas. K. McCathran
John H. Diggers

Inventor
Robert A. A. S. Piercy,
By E. G. Siggers
atty.

R. A. A. S. PIERCY.
STAGING OR SUPPORT FOR SUBMARINE OPERATIONS.
APPLICATION FILED APR. 10, 1912.

1,127,507.

Patented Feb. 9, 1915.
15 SHEETS—SHEET 10.

Witnesses
Jas. K. McCathran
John H. Siggers

Inventor
Robert A. A. S. Piercy,
By E. G. Siggers
atty.

R. A. A. S. PIERCY.
STAGING OR SUPPORT FOR SUBMARINE OPERATIONS.
APPLICATION FILED APR. 10, 1912.

1,127,507.

Patented Feb. 9, 1915.
15 SHEETS—SHEET 12.

Fig. 66.

Witnesses
Jas. K. McCathran
John S. Siggers

Inventor
Robert A. A. S. Piercy,
By E. G. Siggers
atty.

R. A. A. S. PIERCY.
STAGING OR SUPPORT FOR SUBMARINE OPERATIONS.
APPLICATION FILED APR. 10, 1912.

1,127,507.

Patented Feb. 9, 1915.
15 SHEETS—SHEET 13.

Witnesses
Jas. K. McCathran
John B. Diggers

Inventor
Robert A.A.S. Piercy,
By E. G. Siggers
atty.

R. A. A. S. PIERCY.
STAGING OR SUPPORT FOR SUBMARINE OPERATIONS.
APPLICATION FILED APR. 10, 1912.

1,127,507. Patented Feb. 9, 1915.

Inventor
Robert A. A. S. Piercy,

Witnesses

UNITED STATES PATENT OFFICE.

ROBERT ALWYN ARNOLD STEPHEN PIERCY, OF SCRUBWOOD, WENDOVER, ENGLAND.

STAGING OR SUPPORT FOR SUBMARINE OPERATIONS.

1,127,507.

Specification of Letters Patent.

Patented Feb. 9, 1915.

Application filed April 10, 1912. Serial No. 689,852.

*To all whom it may concern:*

Be it known that I, ROBERT ALWYN ARNOLD STEPHEN PIERCY, a subject of His Majesty the King of England, residing at Scrubwood, Wendover, in the county of Buckingham, Kingdom of England, have invented certain new and useful Improvements in and Relating to Stagings or Supports for Submarine Operations, of which the following is a specification.

The object of the present invention is to provide an improved staging or support for conducting submarine boring, blasting, piledriving, block-setting and like operations where it is desirable to place or carry plant or appliances for sea or other work upon a rigid platform or support, that can readily be moved in any direction. To this end I provide a locomotive or traveling staging or support comprising two or more crossed structures, frames, members or components which normally rest firmly on the sea or other bottom and which are connected to each other at their points of intersection or contact so as to be capable of being moved relatively thereto in any horizontal direction to meet different working positions. Such a staging possesses certain advantages as compared with that class previously invented by me and comprising inner and outer structures, as it is cheaper to build; lighter in weight; and the amount of travel at one time or stage is greater owing to there being less overhanging weight; the center of gravity as will be readily understood always having to be kept within the supporting members for the time being. Further I am enabled to partly or wholly dispense with a separate rolling frame. In one construction I attain this object by the use of a number of girders, generally arranged in groups, the members of each group being more or less parallel to one another, but disposed at an angle, generally a right angle or nearly so, to the members of the other group or groups. Each separate girder is preferably supported by one two or more spuds, or more or less vertical, and vertically movable, supports. In certain cases, examples of which are hereinafter described, some of the said components can be employed without spuds, providing, enough other components having spuds are employed.

Two or more parallel girders forming a group, can be rigidly or otherwise connected or braced together or united into a component framework, which combination would then be supported by three, four, or more spuds, girders or frames which cross each other and are movably connected at their points of contact or intersection in such a manner as will enable either to be moved horizontally in any direction relatively to the other including a rotary or angular movement, but which will not permit of any but a very small movement (due to the necessary mechanical clearance) in a vertical direction, thus permitting either girder or frame to support or partly support the other while it is being moved. Thus one or more of the girders or the entire frame as the case may be can be run ahead in its own line, or moved bodily sidewise, or turned about an angle, or run ahead and moved sidewise or run ahead and turned.

There is no restriction, within the limits of the lengths of the girders, of the positions they may take up. Thus by alternately lifting the spuds, moving the girders and lowering the spuds, the whole combination can be moved in any direction, or be turned, or moved and turned at the same time.

As stated previously two or more parallel girders can with advantage in most cases be connected or braced together to form a rigid group. In the case of independent girders above referred to the connections would have to be rigid enough to keep the girders firmly in an upright position or movable guys or other means adopted to attain the same end.

It will be understood that movement in any direction is possible. And that the forms the combinations may take are too numerous to permit of separate description. Any one or all of such members may form tool carrying or working stages according to the requirements of the work to be carried out.

The invention is hereinafter described with reference to the accompanying diagrams and drawings in which:—

Figures 1 to 23 are diagrammatic views showing by way of example different forms, which the girders constituting, either separately, or when combined with another or others, the separate components of a stage, may take; Figs. 65 and 66 show in elevation and plan a complete stage in greater detail and Figs. 67 to 76 are diagrams hereinafter referred to.

In the whole of the foregoing drawings and in the following description the reference letters a b c, etc., are used to generally denote the various component structures adapted to be combined in the manner described by means of joints or roller boxes to make a complete locomotive staging. Each of said components may comprise a single straight or multi-armed girder or member, rigid or jointed in itself, or it may be built up from a plurality of such members which may be rigidly or flexibly connected. Each member of the separate components of a stage would be provided with one, two or more supporting piles or spuds adapted to rest upon the sea or other bottom so that by lifting the spuds of one component it will be free to move relatively to the other compo- or components, which then act as supports therefor, until the spuds are lowered and the others lifted, when the order of movement is reversed.

Several forms of girders, which may be adapted to separately or when combined with another, or others, form one of the components of a stage, are illustrated in Figs. 1 to 23 and these may some or all be provided with supporting spuds at any convenient points in their length as may be required for any particular construction of stage.

In the case of a combination of girder elements it is not essential that each element has an integral supporting spud so long as it is combined with a suitable number of other members which are so provided and supported; at least three spuds being required, to support a complete stage during movement.

The beams or girders may be constructed in any suitable manner as may be demanded by conditions to be met and material available or suitable.

Figure 1:
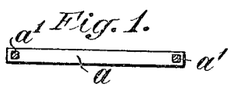
Figure 2:
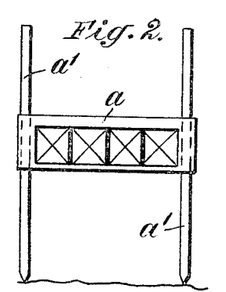
Figure 3:
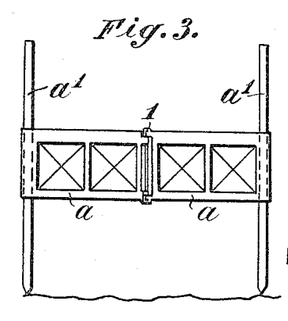
Figure 4:
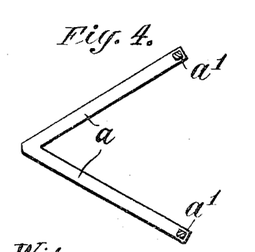
Figure 5:
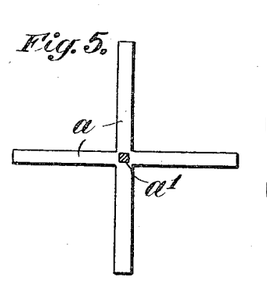
Figure 6:
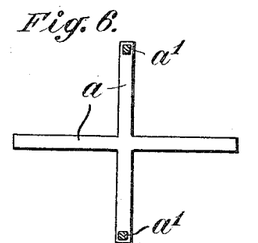

In Fig. 1 a straight girder a is shown which may be provided with one, two or more vertically movable supporting spuds a' at its ends or at any points intermediate its length and these would be manually or power operated in any well known manner. Fig. 2 shows such a girder or member in elevation and Fig. 3 is a substantially similar view showing the girder a formed in two sections which are hinged together at 1. Instead of so hinging two members together I may employ a rigid angular or bent girder as shown in plan in Fig. 4. Figs. 5, 6, 7 and 8 illustrate different forms of cross shaped girder elements which may be employed. Such members may, as shown in Fig. 5, have one spud at their center; as in Fig. 6 two spuds, or as in Fig. 7 four spuds. Two such girders may also as in Fig. 8 be joined by a hinge, allowing of angular movement between them, and any number of spuds may be provided on one or both of the said members. I may also connect two girders a a together by means of the tie bars or girders 2, as in Fig. 9 or by means of tie bars 2, and hinges 3 as in Fig. 10 allowing a motion similar to that of parallel ruler.

In Fig. 11 two girders a a are shown, joined by a single tie girder 2, with two hinges 3. Such a pair of girders rigidly or hingedly connected may have four or any other number of spuds, or a single spud in the center of the tie girder 2. Or I might also employ a pair of spuds and a hinged tie as in Fig. 13.

Figure 14:
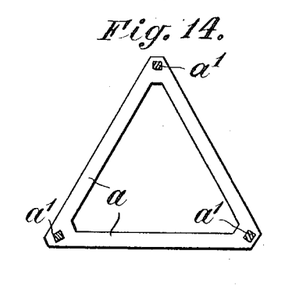
Figure 15:
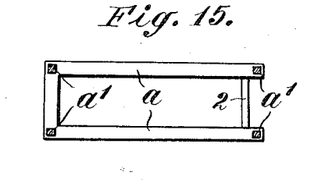
Figure 16:
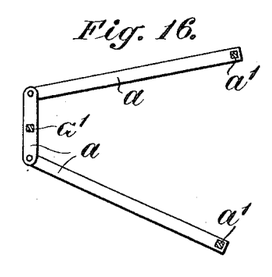
Figure 17:
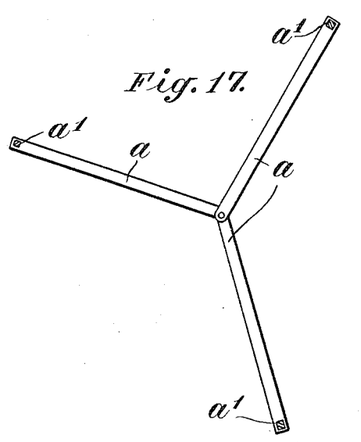
Figure 18:
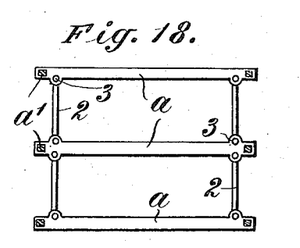

Fig. 14 shows three triangulated girders a with three spuds. Fig. 15 shows three girders a forming the three sides of a rectangle and one tie girder 2 and four supporting spuds a'. Fig. 16 shows an arrangement in which three hingedly connected girders a are employed in conjunction with three spuds a', and Fig. 17 three girders a joined by one central hinge and also having three spuds a' similar to Fig. 3 in elevation. I may further as shown in Fig. 18 employ three or more girders a hinged together in parallel by pairs of intermediate ties 2.

Figure 19:
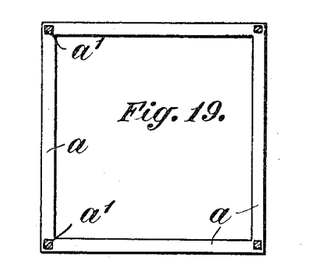
Figure 20:
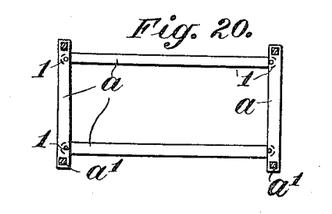

Fig. 19 shows four girders a forming a square, and four spuds a'. These girders a might however be hinged together at 1 as in Fig. 20.

Figure 21:
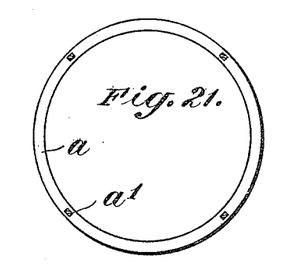
Figure 22:
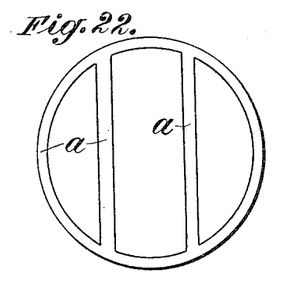

Fig. 21 shows one circular girder a also having four spuds a' around its length, and Fig. 22 a circular girder a and two straight girders a a combined therewith. I could also modify this latter form as in Fig. 23 by providing two concentric circular girders a a joined by radial tie girders 2.

The above figures show examples only of one component which is combined with another component b or others, b c d . . . similarly or differently constructed to form a complete stage. They by no means show all the variations that can be effected and are intended to indicate on what lines the designer can proceed.

Figs. 24 to 49 show diagrammatically various complete locomotive stages made with, or composed of, two or more such component stages a b . . . and the manner in which they are moved. No details are given of which spuds have to be lifted but this will readily be understood. The girders of the separate components are connected together at the points marked x where they cross in the manner hereinafter explained.

Figure 23:
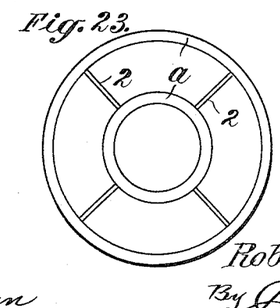
Figures 24, 25, 26, 27, 28, 29:
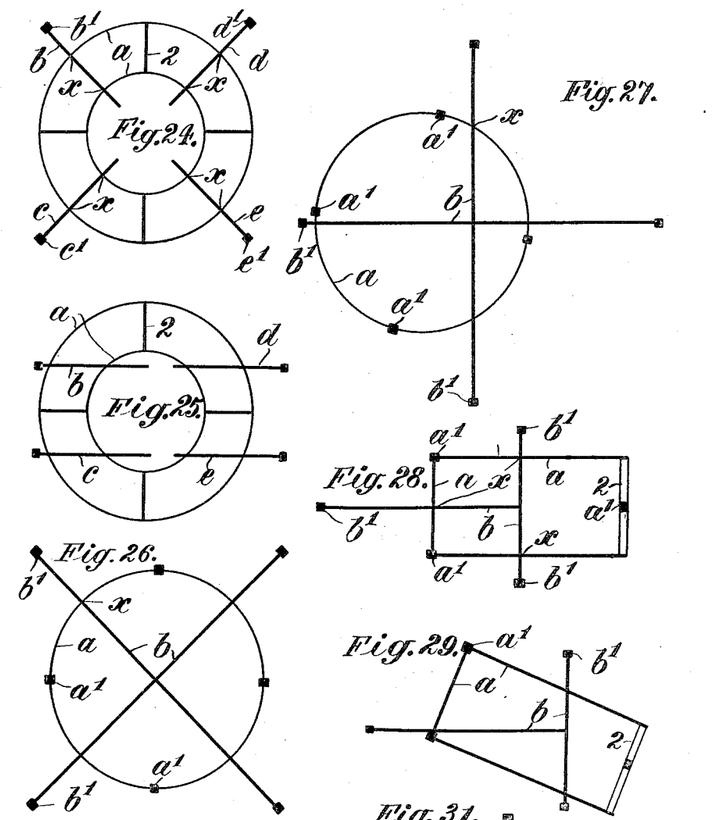
Figs. 24 to 49 are also diagrammatic views of possible stagings which may be constructed by combining the components shown in the previous figures.
Figure 30:
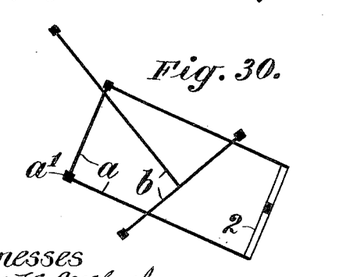
Figure 31:
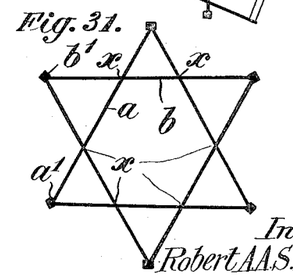
Figures 32, 33, 34, 35, 36, 37, 38, 39:
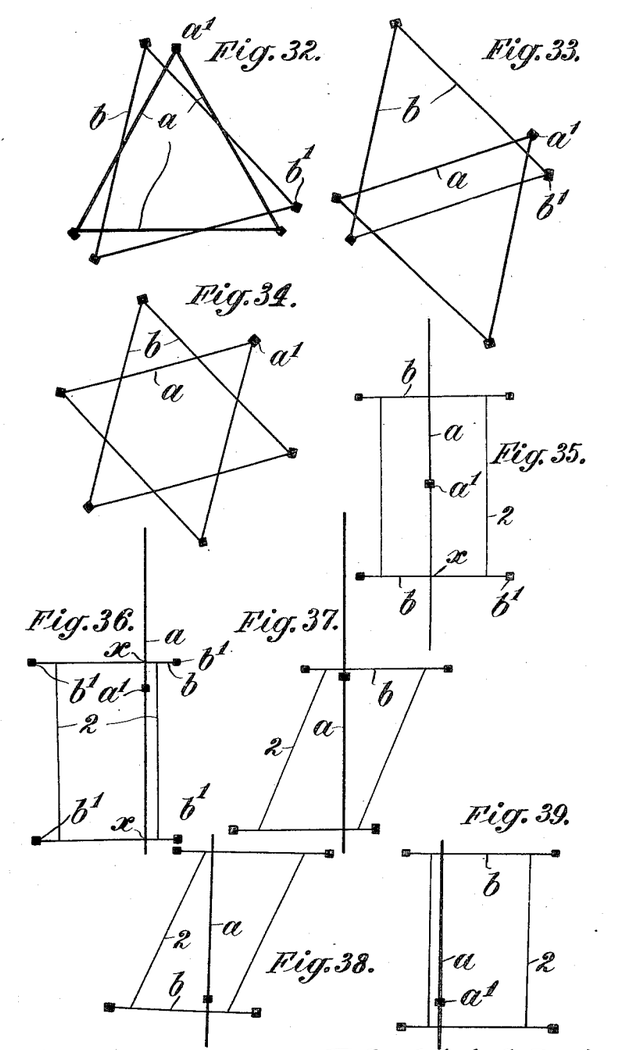
Figure 40:
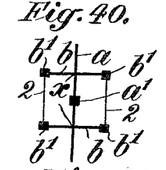
Figure 41:
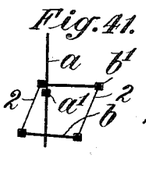
Figure 42:
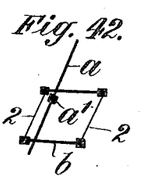
Figure 43:
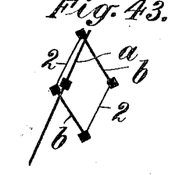
Figures 44, 45:
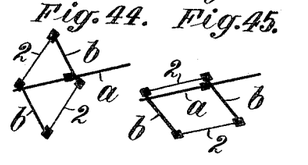
Figure 46:
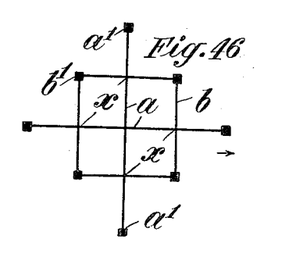
Figure 47:
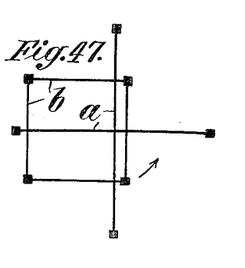
Figure 48:
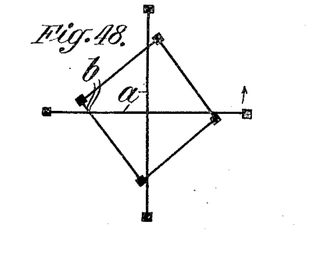
Figure 49:
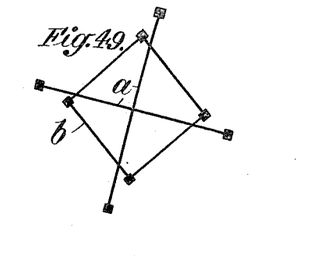

Figs. 24 and 25 show in two positions a combination of a double circular component $a$ without spuds as in Fig. 23 and four straight girders $b\ c\ d\ e$ with one spud each. In cases where there are only four spuds on the members $b, c, d, e$ in moving, only one of the spuds would be lifted at a time and the respective girder moved to a new position. The circular component $a$ would itself be moved when all the four other spuds of $b\ c\ d$ and $e$ are down. Figs. 26 and 27 show similarly a single circular component $a$ and another cross shaped component $b$ as in Fig. 7. Figs. 28, 29 and 30 show in altered positions a combination of one component $a$ similar to that shown in Fig. 13 and one substantially similar to 7, but with one arm omitted. Each component in this case has three spuds.

Figure 10:
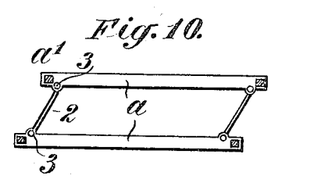
Figure 12:
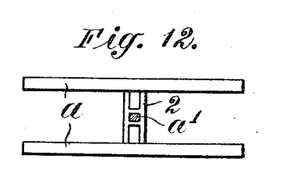
Figure 13:
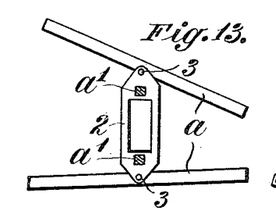

Figs. 31 to 34 show, also in altered position, a combination of two components $a\ b$ such as are shown in Fig. 14; each having three spuds. Figs. 35 to 39 show similarly a combination of a single girder $a$ with one spud $a'$ and an arrangement $b$ such as is shown in Fig. 10. In this case there are only five spuds and two connections $x$ (roller carriages). In moving the component $a$ its one spud $a'$ is lifted. In moving the component $b$ only two of its spuds are lifted at one time and swung forward by reason of the hinges, the stage then resting on the other three spuds. It will be seen from Fig. 39 that a certain amount of side travel is possible and can be obtained in either one direction or the other, by the same methods that apply to the ordinary parallel ruler, which can be moved anywhere over the board.

Figs. 40 to 45 show a similar stage composed of components $a$ and $b$ the latter with hinges at the spuds which enable the parallel ruler motion to be performed with either pair of girders.

Figure 7:
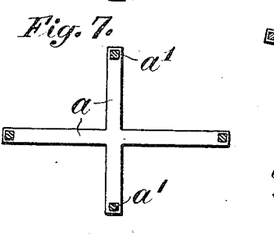
Figure 8:
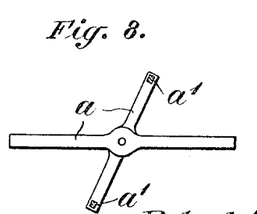

Figs. 46 to 49 show a combination of the components shown in Fig. 7 and Fig. 19. Its action is easily seen and there are in this case four roller carriages.

At all of the points of intersection marked $x$ or where the girders of one component cross those of another component they are so connected with each other that the respective girders are capable of mutually supporting each other while being free to move in any horizontal direction. Several instances of such connections are hereinafter described with reference to Figs. 50-64 of the drawings.

Figure 50:
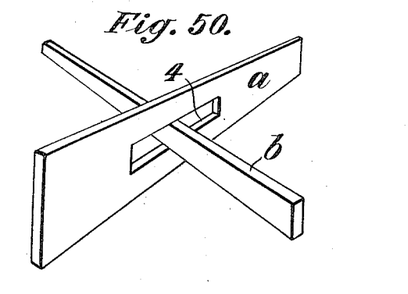
Figs. 50 to 64 of the drawings are detail views hereinafter referred to, which show various methods or means of connecting the crossed beams or girders of the separate components together, to form a complete stage.

Fig. 50 is a perspective view of two girders $a$ and $b$ of two component structures. The one girder $a$ is provided with a slot 4 or other arrangement, through which the other one $b$ passes. The relative movements possible to each girder will be readily understood. The same principle is applied in Fig. 51 but in this case rollers 6, 7, 8 and 9 are provided on the two members $a$ and $b$ to reduce the frictional resistance of the parts. Fig. 52 is a sectional elevation of this construction.

Figure 52:
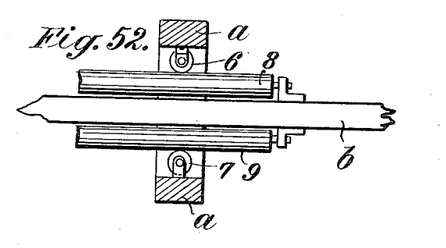
Figure 53:
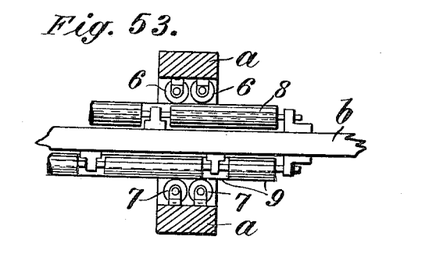
Figure 54:
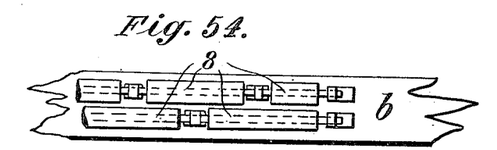

Figs. 53 and 54 show in sectional elevation and plan how the long rollers 6, 7, 8 and 9 in Fig. 52 may be replaced by a number of shorter ones, arranged in two parallel rows, so that one roller will always cover the gap between the two rollers alongside of it. Thus the rollers of one girder pass across the rollers of the other girder and will always be fully supported in spite of the gaps between these rollers.

Figure 51:
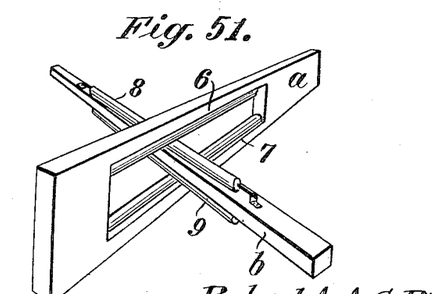
Figure 55:
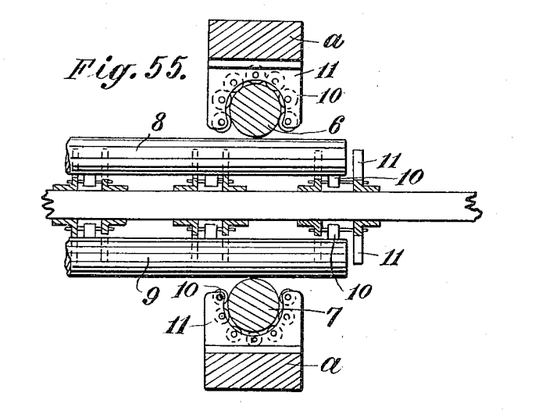

Fig. 55 shows how the rollers, 6, 7, 8 and 9 as shown in Figs. 51 and 52, might be supported and held in position by means of other antifriction wheels 10. In this construction the main rollers 6, 7, 8 and 9 act upon one another, and permit the free movements of the girders $a$ and $b$ in the same way as those in Figs. 51 and 52 and 10 are small wheels or rollers mounted in the brackets or bearings 11 which are bolted to the said girders $a$ and $b$. Any length of main roller could thus be supported.

Figure 56:
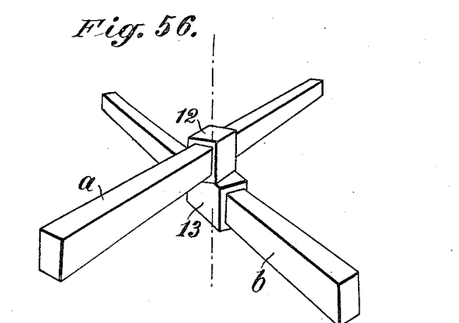
Figure 57:
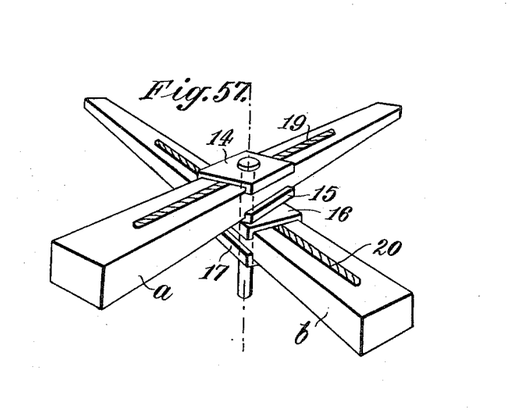
Figures 58, 59:
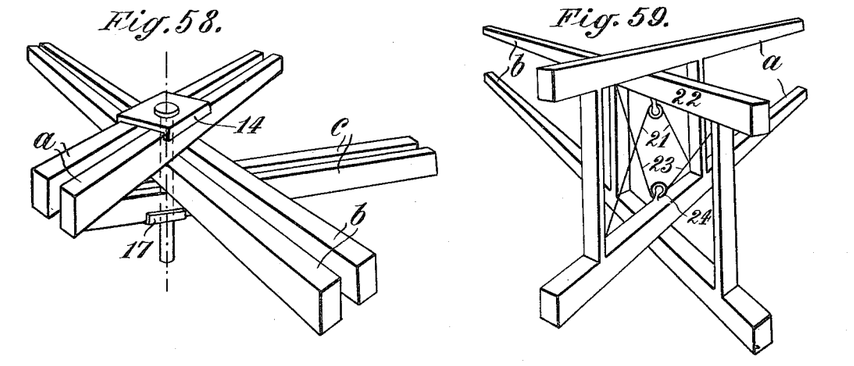

Figs. 56 to 58 show forms of sliding swivel connections. In Fig. 56 the girder $a$ passes through a guide 12 which is connected by a swivel to another guide 13 through which the girder $b$ passes.

In Fig. 57 the two girders $a$ and $b$ are slotted (or consist of two girders running parallel to one another as in Fig. 58). They work in pairs of guide plates 14, 15 and 16, 17. The swiveling motion is made possible by a pin 18 passing through all the guide plates and the slots 19 and 20 in the girders. The axis also in this case is indicated by the line A—A.

Fig. 58 shows three girders $a$, $b$ and $c$ connected in the same way. Each girder consists of a pair of girders running parallel.

Figures 60, 61:
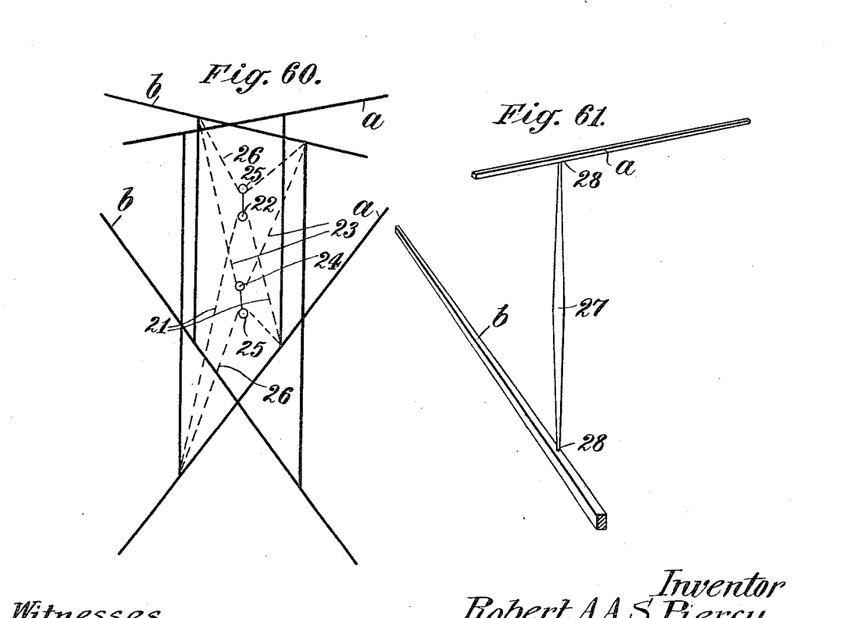

Figs. 59 and 60 show another way of connecting two girders together to the same end. Here each girder $a\ b$ consists of an upper and lower boom. The upper boom of $b$ is connected to the lower boom of $a$ by means of the flexible rope 21 and pulley 22, and the upper boom of $a$ is connected to the lower boom of $b$ by a rope 23 and pulley 24. It will be seen that either girder can support the other, and is free to move relatively to it in any horizontal direction within the limits provided for.

Fig. 60 shows additional pulleys 25 and ropes 26 to facilitate the relative movements of the two members $a$ and $b$.

Fig. 61 shows a suitable connection made by means of a simple tie or strut 27, with any kind of universal joint 28 at its two ends. Special means would in these three latter cases be adopted to hold the girders in place horizontally.

Figure 62:
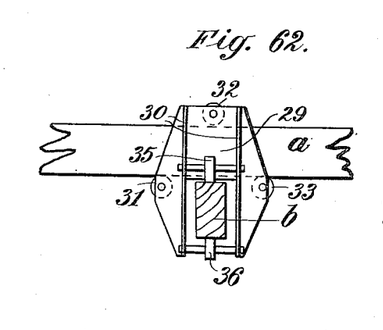
Figure 63:
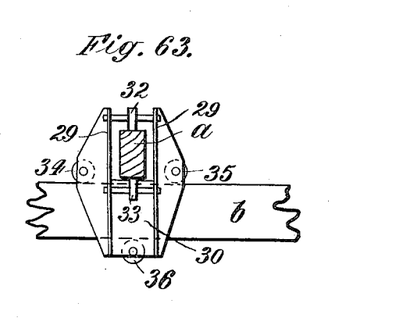
Figure 64:
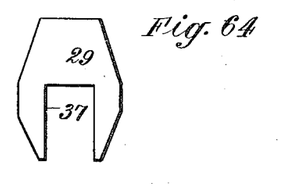

Another very suitable form of rigid box construction for uniting two cross girders *a* and *b* of a staging can (as shown in Figs. 62, 63 and 64) be built up from four vertically arranged plates 29, 29 and 30, 30, of suitable or similar shape connected together so that two parallel plates 29 support the three rollers 31, 32, 33 for engaging the girder *a* and the other two plates the three rollers 34, 35 and 36 for engaging the other or transverse girder *b*. The plates of one girder are cut away as shown at 37 for the passage of the other girder. It will be noted that in this arrangement either girder is capable of being moved longitudinally in any horizontal direction and also that the two girders can be relatively slewed or twisted within the limits allowed for by the slackness between the girders *a* and *b* and the side plates 29 and 30 of the box or wheel cage.

Figure 9:
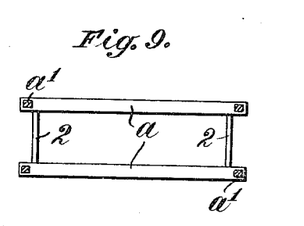
Figure 65:
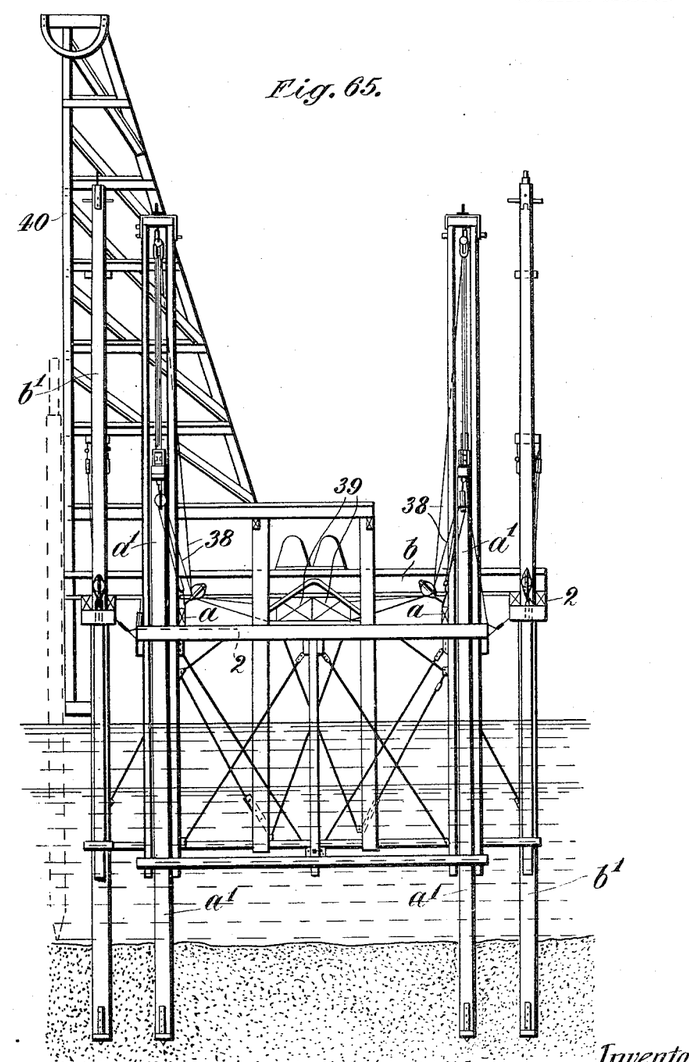
Figure 66:
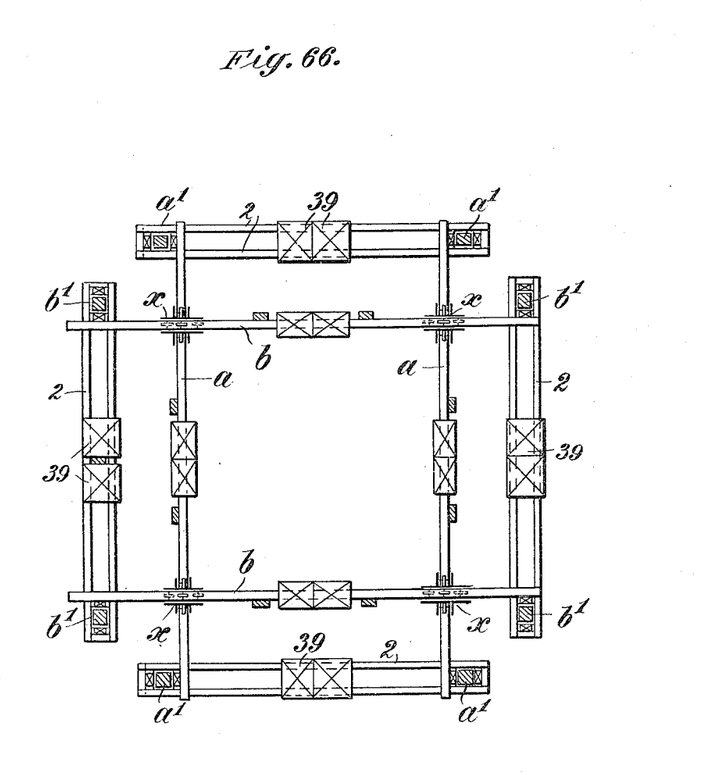

A more concrete example of a stage which has been found in practice to be very advantageous is shown in elevation and plan in Figs. 65 and 66. This is practically a combination of two components such as are shown in Fig. 9 with roller carriages as in Figs. 62 to 64. In this case the stage comprises two crossed components each of which is built up from two main girders *a a*, *b b* respectively.

The girders of each component are united by two tie girders or frames 2 forming vertical guides for the respective supporting spuds *a'*, *b'*. Four roller boxes as previously described are employed one at each cross connection *x* of the main girders *a a b b*. In the instance shown the spuds *a' b'* are adapted to be raised or lowered as circumstances require by means of rope and pulley gear 38 and winches 39 which may be hand or power operated as may be desired. As an instance of work upon which the stage may be employed a pile driver 40 is shown mounted on one of the components.

Figure 67:
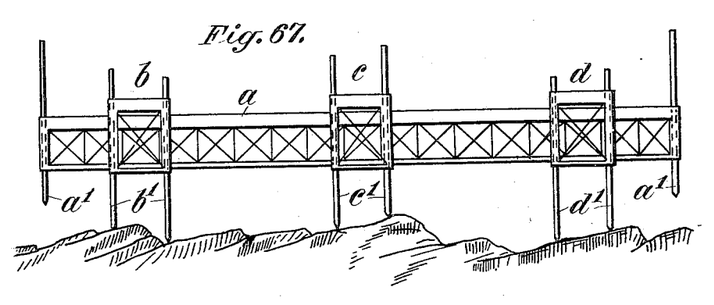
Figure 68:
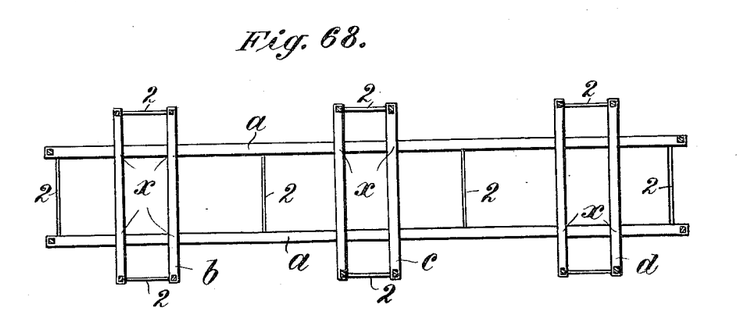
Figure 69:
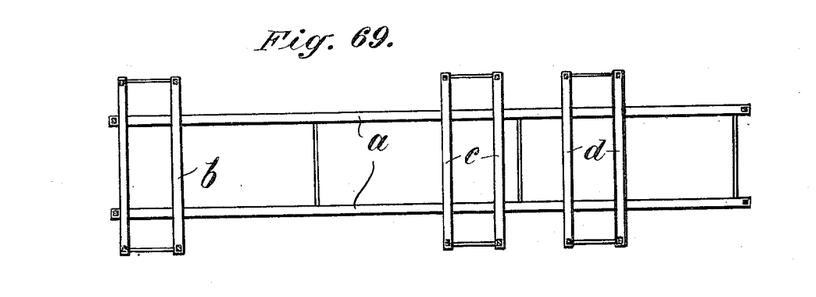
Figure 70:
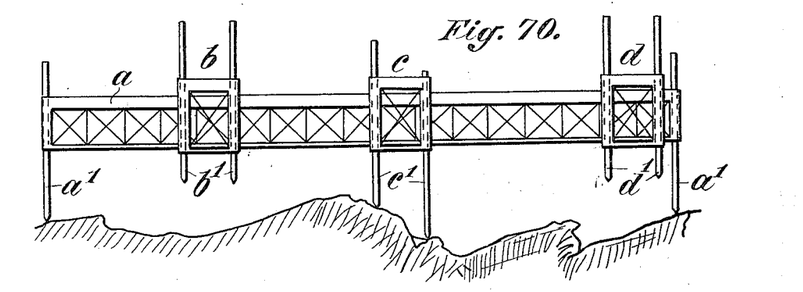
Figure 71:
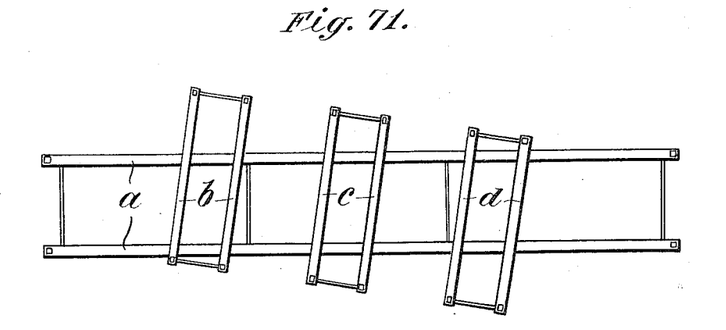
Figure 72:
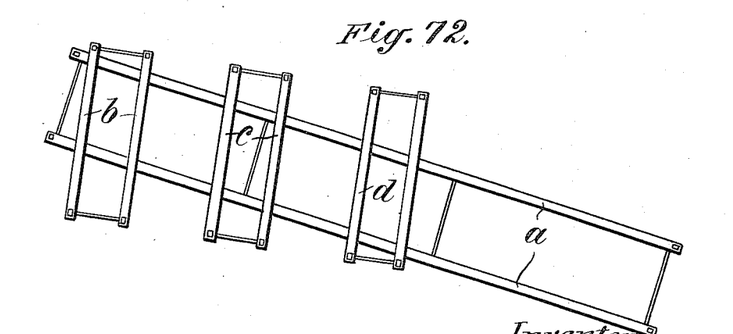
Figure 73:
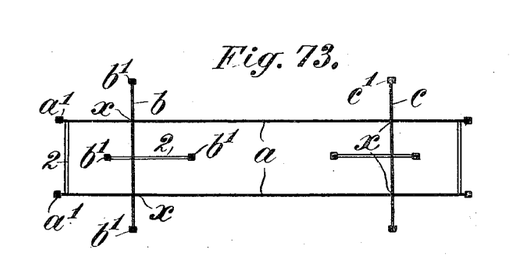

Figs. 67 to 72 show a stage consisting of four component stages *a b c d* each with four spuds. They have the object of illustrating some of the possible movements and are all of the type shown in Fig. 9. There would be 12 roller carriages or connections at *x x*... Fig. 67 is an elevation; Fig. 68, a plan. The spuds *a'* of stage *a* are up and the rest down, so that the component *a* can be moved. Fig. 69 is a plan and shows the component *a* after it has been moved ahead; it also supposes that the spuds *c'* have been lifted and the component *c* moved ahead. Fig. 70 is an elevation showing the components *b* and *d* moved ahead made possible lifting their respective spuds. The figure also illustrates the ease with which a stage of this description traverses uneven ground or sea-bed. Figs. 71 and 72 illustrate the movements that would be made for the purpose of slewing the stage. In Fig. 72 the component *a* has been moved ahead as well as slewed.

Figure 74:
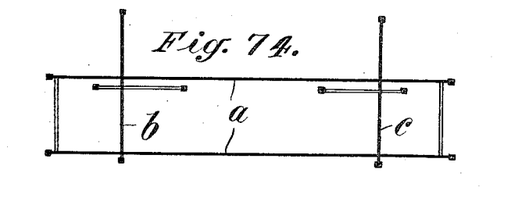
Figure 75:
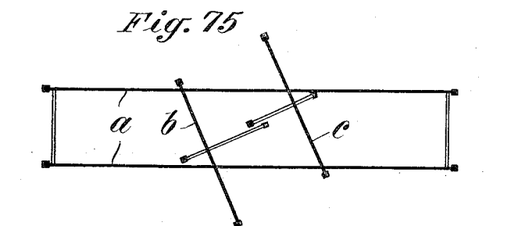
Figure 76:
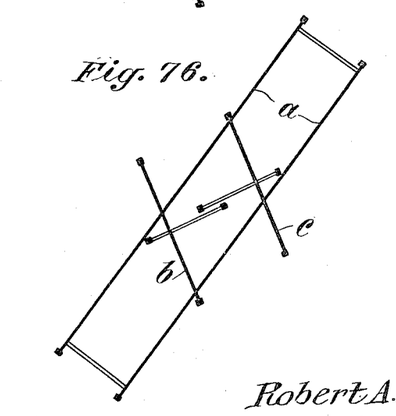

Figs. 73 to 76 show a stage of 3 components, *a b* and *c* one as in Fig. 9 and the other two consisting, each of one main girder and one tie girder 2 and each with four spuds. The movable connections or roller boxes are situated at *x* where the main girders *a a* cross the main girders *b* and *c* of the two other components. There are here only four roller carriages, and yet very great mobility can be obtained. Fig. 74 shows a sidewise movement, and Figs. 75 and 76 show the movements required for slewing. The amount of "slew" or rotation obtained in one operation is very considerable.

In combining component stages to form a complete locomotive stage various considerations will govern the general arrangement. One or more of the component stages will be arranged to carry the working plant, tools or the like and will be constructed accordingly. The size and shape of the various component stages, and the relative positions of the spuds will be so arranged as to give the required facilities for travel or movement. The levels of the different girders will be so arranged as to clear one another, and if the girders are braced girders, and go through each other, the bracing will be so disposed as to allow of the desired relative movements of the two girders without any parts fouling each other.

The different girders may lie mainly at two different levels or there may be different sets of girders superimposed, each serving different purposes. Or all the girders may be disposed at the same or nearly the same level. The position of the spuds will be chosen with reference to the stability of the whole structure, and to the convenience of the plant and tools carried by the stage.

It will be seen that according to this invention a locomotive stage can be constructed which shall have distinct advantages over any stages built on hitherto known lines and further that greater latitude is given to the designer in arranging the positions of the spuds.

What I claim and desire to secure by Letters Patent of the United States is:—

1. A locomotive staging or support for the purpose described, comprising a plurality of component stages or structures formed of girders and provided with supporting spuds, the girders of one component crossing those of another and there movable in any direction one on the other in a substantially horizontal plane.

2. A locomotive staging or support for the purpose described, comprising a plurality of component stages or structures arranged crosswise of each other and including girders, and means for connecting the girders of the separate components together at the places where they cross or intersect each other, said connecting means being constructed to permit movement of one component on another in any direction in a substantially horizontal plane.

3. A locomotive staging or support for the purpose described, comprising a plurality of component structures formed of girders and provided with vertically adjustable spuds, the girders of one component being arranged crosswise of those of another component and connected together where crossing, said connections being constructed to permit any component to support another component or components and to permit the supported component or components to be moved in any horizontal direction.

In testimony whereof I have hereunto affixed my hand this 28th day of February in the presence of two subscribing witnesses.

ROBERT ALWYN ARNOLD STEPHEN PIERCY.

Witnesses:
WM. N. HAYGOOD,
N. D. SMALL.

Copies of this patent may be obtained for five cents each, by addressing the "Commissioner of Patents, Washington, D. C."